(12) United States Patent
Grylls et al.

(10) Patent No.: US 6,755,619 B1
(45) Date of Patent: Jun. 29, 2004

(54) TURBINE BLADE WITH CERAMIC FOAM BLADE TIP SEAL, AND ITS PREPARATION

(75) Inventors: Richard John Grylls, Loveland, OH (US); Curtiss Mitchell Austin, Loveland, OH (US); Jerry Donald Schell, Evendale, OH (US)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 09/709,010

(22) Filed: Nov. 8, 2000

(51) Int. Cl.⁷ .............................................. F01D 11/08
(52) U.S. Cl. ................ 416/224; 416/241 B; 415/173.1; 415/173.4; 428/304.4; 428/306.6; 428/307.3; 428/307.7; 428/312.2
(58) Field of Search ......................... 415/173.1, 173.4, 415/173.5, 200; 416/224, 229 A, 230, 241 B; 428/304.4, 306.6, 307.3, 312.2, 469, 632, 307.7

(56) References Cited

U.S. PATENT DOCUMENTS

| | | |
|---|---|---|
| 4,375,233 A | 3/1983 | Rossmann et al. |
| 4,673,435 A | 6/1987 | Yamaguchi et al. |
| 4,955,135 A | 9/1990 | Pinkhasov |
| 4,956,137 A | 9/1990 | Dwivedi |
| 5,011,063 A | 4/1991 | Claar |
| 5,061,660 A | 10/1991 | Park et al. |
| 5,214,011 A | 5/1993 | Breslin |
| 5,308,422 A | 5/1994 | Askay et al. |
| 5,503,213 A | 4/1996 | Pyzik et al. |
| 5,518,061 A | 5/1996 | Newkirk et al. |
| 5,728,638 A | 3/1998 | Strange et al. |
| 5,952,110 A | * 9/1999 | Schell et al. ................. 428/632 |
| 6,135,715 A | * 10/2000 | Correia ..................... 415/173.1 |
| 6,190,124 B1 | * 2/2001 | Freling et al. ........... 415/173.4 |
| 6,254,998 B1 | * 7/2001 | Tuchinsky ................... 428/567 |

FOREIGN PATENT DOCUMENTS

GB 2225388 A * 5/1990 .............. 415/173.4

OTHER PUBLICATIONS

J. Ringnald et al., "Scanning and Transmission Electron Microscopy on Composite Materials prepared by SMP and In–Situ Displacive Reactions," *Inst.Phys.Conf.Ser.* No. 147, Section 13, pp. 571 et seq. (1995).

Nine page printout from Internet page of BFD, Inc, www.bfd–inc.com, printed Apr. 24, 2000.

Guide to Selection of Superalloys, *Metal Progress*, Mid Jun. 1978, pp. 107–107.

* cited by examiner

*Primary Examiner*—Christopher Verdier
(74) *Attorney, Agent, or Firm*—Gregory O. Garmong; Carmen Santa Maria; McNees Wallace & Nurick LLC

(57) ABSTRACT

A turbine blade has an airfoil section with a root end and a tip end, and an attachment at the root end of the airfoil section. A blade tip seal is joined to the tip end of the airfoil section. The blade tip seal is formed as an open-cell solid aluminum oxide foam made of aluminum oxide cell walls having intracellular volume therebetween. The blade tip seal has a blade interface region adjacent to the tip end of the airfoil section. The blade interface region is formed of the aluminum oxide foam and a nickel-base alloy within the intracellular volume. The blade tip seal also has a contact region remote from the blade interface region and comprising the aluminum foam wherein the intracellular volume is porosity.

20 Claims, 4 Drawing Sheets

TURBINE BLADE WITH CERAMIC FOAM BLADE TIP SEAL, AND ITS PREPARATION

This invention relates to aircraft gas turbines and, more particularly, to the turbine blades used in such gas turbines.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The turbine blades are mounted on a turbine disk, which rotates on a shaft inside a tunnel defined by a stationary cylindrical structure termed the stationary shroud. (This "stationary shroud" is distinct from the rotating shroud found on some turbine blades.) The hot combustion gases flow from the engine's combustor and into the tunnel. The hot combustion gases pass through the turbine blade/turbine vane structure and cause the turbine to turn. To achieve a high efficiency, it is important that as little as possible of the hot combustion gases leak around the turbine by passing through the clearance between the outermost tip of the turbine blade and the innermost surface of the stationary shroud. However, the sealing of the turbine structure against such leakage presents a problem, because the components of the structure expand and contract differently during the temperature changes of over 2000° F. that are experienced during each cycle of engine operation.

To prevent the leakage of hot combustion gases around the turbine, it is known to size the components so that there is initially a very small gap between the blade tips of the turbine blades and the inner surface of the stationary shroud. As the turbine blades heat and expand when the engine is first operated, there is a contacting between the blade tips and the stationary shroud as the turbine turns. Further contacting between the blade tips and the stationary shroud sometimes occurs again during operation of the engine in the usual operating conditions or under unusual conditions such as application of emergency power or large loads applied to the components.

In these circumstances, material may be worn away from the blade tips and/or the shroud, and the clearance gap between the blade tips and the inner surface of the stationary shroud increases. Over time the efficiency of the gas turbine declines because increasing amounts of hot combustion gas leak through the enlarged clearance gap. When the efficiency has decreased by an amount that justifies a repair, the blade tips are repaired by welding new material onto the blade tips to lengthen them back to about their original lengths, and/or the shrouds are refurbished or replaced.

The repair of the blade tips is costly and difficult to perform for some configurations of the turbine blades. There is a need for an improved approach to blade tip design and materials to alleviate the problems associated with the wearing away of the blade tips.

BRIEF SUMMARY OF THE INVENTION

The present invention provides a turbine blade with a blade tip seal that is highly resistant to removal by the frictional rubbing that occurs between the blade tip seal and the inner surface of the stationary shroud. The blade tip seal has excellent high-temperature strength capability, and is operable to temperatures in excess of those encountered in current gas turbine engines. The abrasion of the blade-tip material may be controlled by selectively varying its composition. The blade tip seal is reduced in weight as compared with available blade tips, an important advantage that allows the weight of the remainder of the turbine blade, turbine disk, and supporting structure to be reduced as well. It is also more tolerant of excess-temperature excursions, so that less cooling is required and there is less concern with hot spots. The primary component of the blade-tip material is not subject to oxidation damage. The blade tip seal is resistant to the impact damage and erosion that are caused by particles that impact upon it, and it is also resistant to corrosion damage in the combustion gases.

A turbine blade comprises an airfoil section having a root end and a tip end, and an attachment at the root end of the airfoil section. A blade tip seal is joined to the tip end of the airfoil section. The blade tip seal comprises an open-cell solid ceramic foam made of ceramic cell walls having intracellular volume therebetween. The ceramic foam is open celled, so that the intracellular volume may be filled with a metal such as a nickel-base alloy or other material, or it may be porous (empty space).

In one approach, the blade tip seal comprises a blade interface adjacent to the tip end of the airfoil section, with the blade interface comprising the ceramic foam and a metal within the intracellular volume. The metal within the intracellular volume in this blade interface region aids in bonding the blade tip seal to the airfoil section of the metallic turbine blade. Such a blade tip seal may further comprise a contact region remote from the blade interface, with the contact region comprising the ceramic foam and a porous (empty) intracellular volume. The contact region is thus a ceramic skeleton that is self supporting but porous. Although porous, the contact region still serves to prevent combustion gas leakage therethrough. It has sufficient strength, is abrasive, and is impact resistant. The ceramic skeleton is preferably aluminum oxide, but its abrasive properties may be varied with compositional changes such as the addition of an abrasive ceramic mixed with the base ceramic.

The blade tip seal desirably comprises an amount exceeding about 60 volume percent of ceramic, and preferably comprises from about 60 to about 80 percent by volume of ceramic. The physical form of the blade tip seal may be varied as necessary, such as a plate form or a rim form.

The blade tip seal is preferably prepared separately from the airfoil section of the turbine blade, and then the blade tip seal and the airfoil are joined together by an appropriate process such as welding or diffusion bonding. The blade tip seal may be prepared by providing a piece of a sacrificial ceramic having the shape of the blade tip seal, and contacting the piece of the sacrificial ceramic with a reactive metal which reacts with the sacrificial ceramic to form an oxidized ceramic of the reactive metal and a reduced form of the ceramic. The resulting structure comprises an open-celled ceramic foam of the oxidized ceramic compound of the reactive metal with ceramic cell walls and the intracellular volume between the ceramic cell walls. The contact region is formed by removing metal from the contact region, leaving the ceramic foam of the contact region with its intracellular volume as porosity. The metal may be removed by any appropriate technique, such as chemically attacking the metal in the contact region during the fabrication processing, or thermally attacking the metal in the contact region during operation of the engine.

The present approach provides a blade tip seal that has sufficient strength and is also abrasive so that it wears away the stationary shroud material, rather than being worn away by the stationary shroud material. The wearing away of the stationary shroud material is preferred to the wearing away of the blade tip to promote roundness of the shroud assembly. Otherwise, one mispositioned shroud could cause all blades to become shorter, increasing leakage around the entire circumference of the turbine. The reduced weight at the furthest extent of the turbine blade, which rotates rapidly on the turbine shaft, allows the reduction in material and weight in other components, such as the remainder of the turbine blade, the turbine disk, the turbine shaft, bearings and other related structure, and the structure that supports the gas turbine engine.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
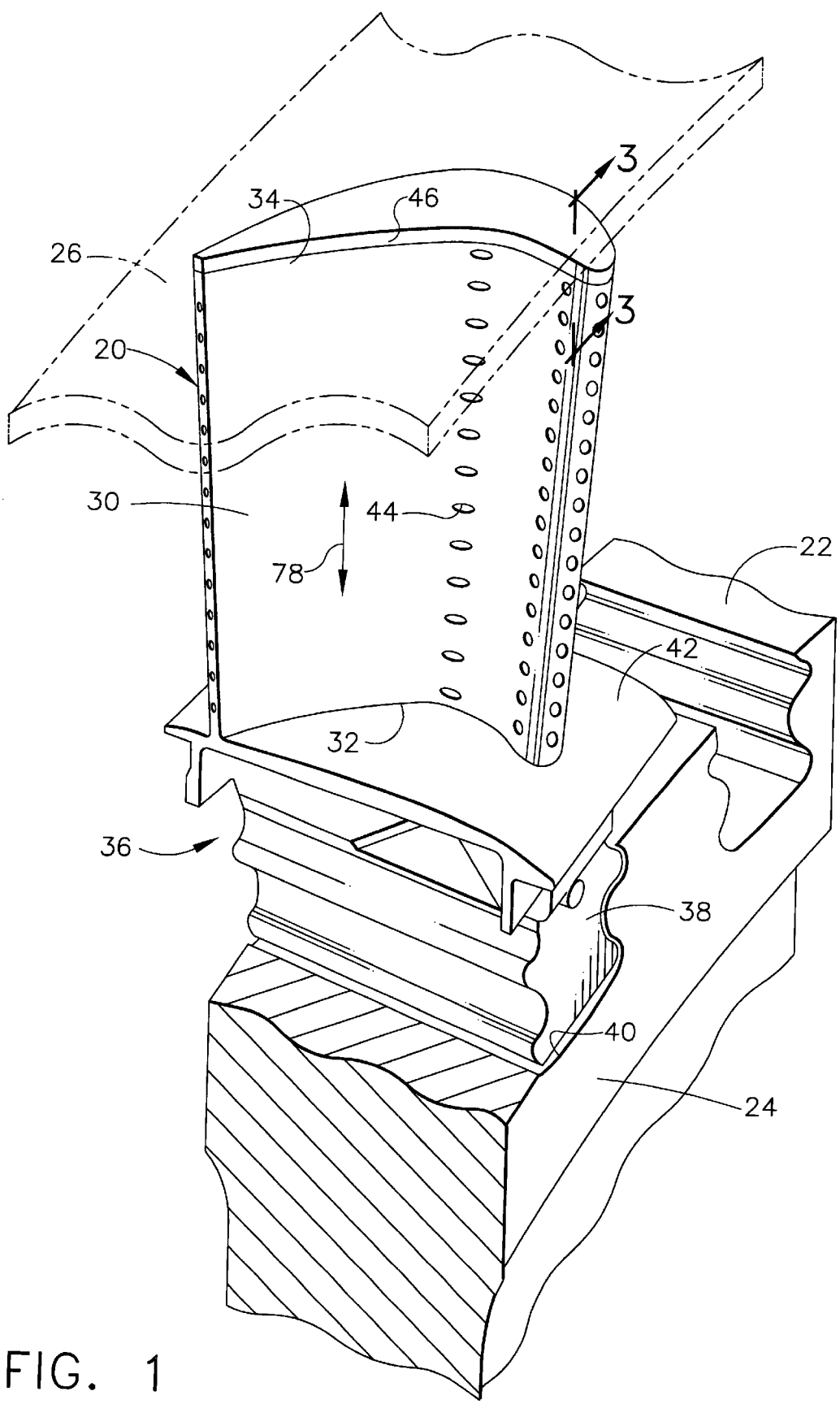
FIG. 1 is a fragmentary perspective view of a turbine blade adjacent to a portion of a stationary shroud.

FIG. 1 depicts a turbine blade 20 mounted to a periphery 22 of a turbine disk 24. There are a large number of turbine blades 20 mounted to the turbine disk 24, but only one is illustrated. The turbine disk 24 rotates on a shaft (not shown) positioned along its centerline. As the turbine disk 24 rotates, the turbine blade 20 sweeps through an annular volume between the turbine disk 24 and a stationary shroud 26.

The turbine blade 20 includes an airfoil section 30 having a root end 32 and a tip end 34. There is an attachment 36 at the root end 32 of the airfoil section 30. In this case, the attachment 36 is a dovetail 38 which extends downwardly from the airfoil section 30 and engages a slot 40 on the turbine disk 24. Equivalently for the present purposes, the attachment 36 may be a bonded joint between the turbine blade 20 and the turbine disk 24, or the attachment 36 may be an integral construction (i.e., a BLISK) of the turbine blade 20 and the turbine disk 24. A platform 42 extends laterally outwardly from the area where the airfoil section 30 is joined to the dovetail 38. A number of internal passages extend through the interior of the airfoil section 30, ending in openings 44 in the surface of the airfoil section 30. A flow of cooling air is directed through the internal passages, to remove heat from the airfoil section 30. The turbine blade 20, other than the blade tip seal to be described next, is typically made of a nickel-base superalloy.

Figure 2:
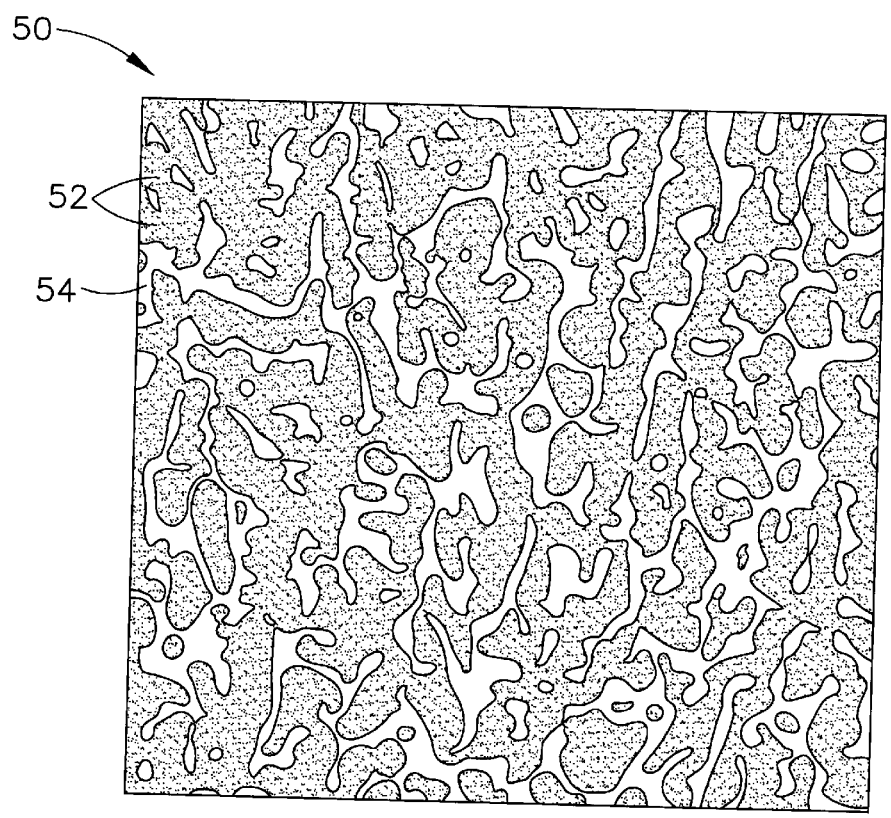
FIG. 2 is an idealized microstructure of the open-cell ceramic material used in the blade tip seal.

A blade tip seal 46 is joined to the tip end 34 of the airfoil section 30. As illustrated in FIG. 2, the blade tip seal 46 comprises an open-cell solid ceramic foam 50 made of ceramic cell walls 52 having intracellular volume 54 therebetween. The ceramic cell walls 52 are continuous through the volume of the ceramic foam 50. As is implicit in the term "open-cell", the intracellular volume 54 is also continuous. That is, the ceramic foam 50 is formed of two interpenetrating, continuous regions—the ceramic of the cell walls 52 and the intracellular volume 54. In the preferred embodiment, the ceramic phase that forms the cell walls 52 occupies an amount exceeding about 60 volume percent of the ceramic foam 50, most preferably from about 60 to about 80 volume percent of the ceramic foam 50. The intracellular volume 54 occupies the remainder of the ceramic foam 50. Because the intracellular volume 54 occupies less than half of the total volume, it is difficult to see from FIG. 2 that the intracellular volumes 54 are interconnected, but such is the case.

The ceramic material that forms the cell walls 52 of the ceramic foam 50 may be any operable ceramic. The preferred ceramic material is aluminum oxide ("alumina"). Aluminum oxide is of particular interest because it is much less dense than nickel-base superalloys, reducing the weight of the material. The ceramic material may be a mix of ceramics, with the ceramic that is present in the largest volume fraction being the "base ceramic". One or more modifying ceramics may be mixed with the base ceramic. Any compatible modifying ceramic may be used to achieve particular properties in the ceramic phase of the cell walls 52, with the modifying ceramic present in an operable amount. For example, the modifying ceramic may be a ceramic material that is more abrasive than the base ceramic. Example of abrasive modifying ceramic that are more abrasive than aluminum oxide and may be mixed with the aluminum oxide base ceramic include sol gel alumina and cubic boron nitride. The cubic boron nitride, when used, is preferably present only at the surface of the blade tip seal to aid in the initial break-in rub. The modifying use of abrasive ceramics is of particular interest in the present application of a blade tip seal, because for most situations it is desirable that the blade tip seal wear away the material of the stationary shroud 26, rather than vice versa.

The intracellular volume 54 may contain another solid material, or it may contain no solid material. In the latter case, it may be considered a void or porosity (although it would contain air). Preferably, at least some of the intracellular volume 54 contains a metal, such as an aluminum-base metal or a nickel-base metal. As used herein, a disclosure of a metal within the intracellular volume 54 includes both the pure form of the metal and its alloys. For example, "nickel" includes pure nickel and nickel-base alloys. As used herein, "metal-base" means that the composition has more of the named metal present than any other element. For example, a nickel-base alloy has more nickel than any other element. The nickel-base alloy may additionally be a nickel-base superalloy, meaning that it is of a composition which is strengthened by the precipitation of gamma-prime phase. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

Figure 3:
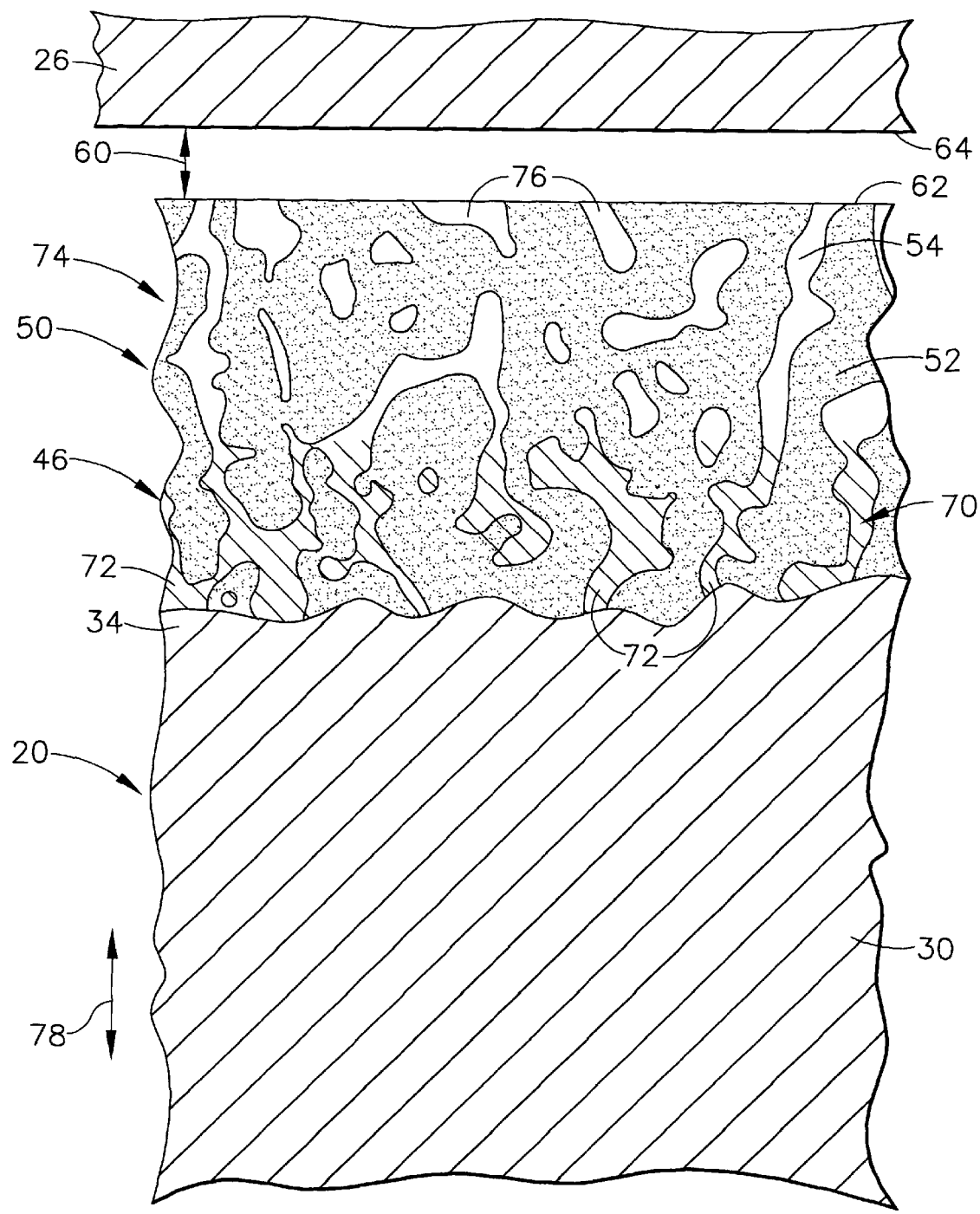
FIG. 3 is an enlarged fragmentary schematic sectional view of the airfoil and blade tip seal, taken on line 3—3 of FIG. 1.

For the blade tip seal 46, it is desirable that at least some of the intracellular volume 54 contain a nickel-base alloy and at least some of the intracellular volume 54 be porosity (i.e., contain no solid phase). FIG. 3 depicts the tip end 34 of the airfoil section 30, the blade tip seal 46, the stationary shroud 26, and a clearance gap 60 between an end 62 of the blade tip seal 46 and an inner surface 64 of the stationary shroud 26. Under some operating conditions of the gas turbine engine, the clearance gap 60 is reduced to zero so that there is rubbing between the end 62 of the blade tip seal 46 and the inner surface 64 of the stationary shroud 26.

The blade tip seal 46 may be described as having a blade interface region 70 adjacent to the tip end 34 of the airfoil section 30. The blade interface region 70 is a region wherein the blade tip seal comprises the ceramic foam 50 and a metal within the intracellular volume 54. The portion of the intracellular volume 54 that contains metal is indicated as metal-containing intracellular volumes 72 in FIG. 3. Some or all of the ceramic material of the cell walls 52 may be removed in these areas to increase the volume fraction of the metal-containing intracellular volume 72 relative to the material of the cell walls. The presence of the metal in the metal-containing intracellular volume 72 aids in affixing the blade interface region 70 to the tip end 34 of the airfoil section 30, as will be discussed subsequently.

In this embodiment of FIG. 3, a contact region 74 of the blade tip seal 46 is remote from the blade interface region 70. The contact region 74 comprises the ceramic foam and its ceramic cell walls 52. Here, there is no solid material in the intracellular volume 54, which is thus open space or porosity 76. The ceramic foam 50 retains much of its strength even in the absence of solid material in the porosity 76, because the cell walls 52 form a continuous skeletal structure of ceramic. The contact region 74 thus has a lower thermal conductivity than a comparable material having metal present in the intracellular volume 54, so that the ceramic contact region 74 acts much like a thermal barrier coating to inhibit heat flow into the metal of the airfoil section 30. The porosity also imparts compliance to the ceramic structure, which is otherwise more sensitive to cracking induced by thermal stresses arising from differences in thermal expansion coefficients and thermal gradients. The all-ceramic structure in the contact region is also resistant to damage by particle erosion and impacts. The porous ceramic tends to crush and absorb energy when impacted by solid particles, rather than forming cracks that can result in spallation of the blade tip seal 46. The porosity 76 may be created by chemically attacking and etching away metal previously filling the portion of the intracellular volume 54 that becomes the porosity 76, or by allowing the metal to melt and/or evaporate (i.e., thermally attacking the metal) and thereby be removed at the elevated temperatures encountered by the contact region 74 during service.

Figure 4:
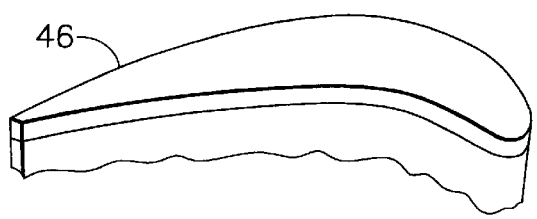
FIG. 4 is a perspective view of a plate embodiment of the blade tip seal.
Figure 5:
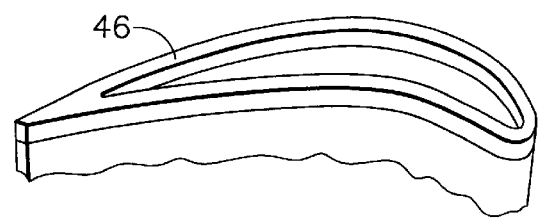
FIG. 5 is a perspective view of a rim embodiment of the blade tip seal.

The blade tip seal 46 may be fabricated in any operable physical shape and form. Typically, the blade tip seal 46 is either a plate that is shaped to attach to and cover the entire end of the airfoil section 30, as in FIG. 4, or a rim that is shaped to attach to and cover only the periphery of the airfoil section 30, as in FIG. 5. In either case, the blade tip seal is relatively thin measured in the direction parallel to a major stress axis 78 of the turbine blade 20. A typical thickness of the blade tip seal 46 is from about 0.010 inch to about 0.100 inch.

Figure 6:
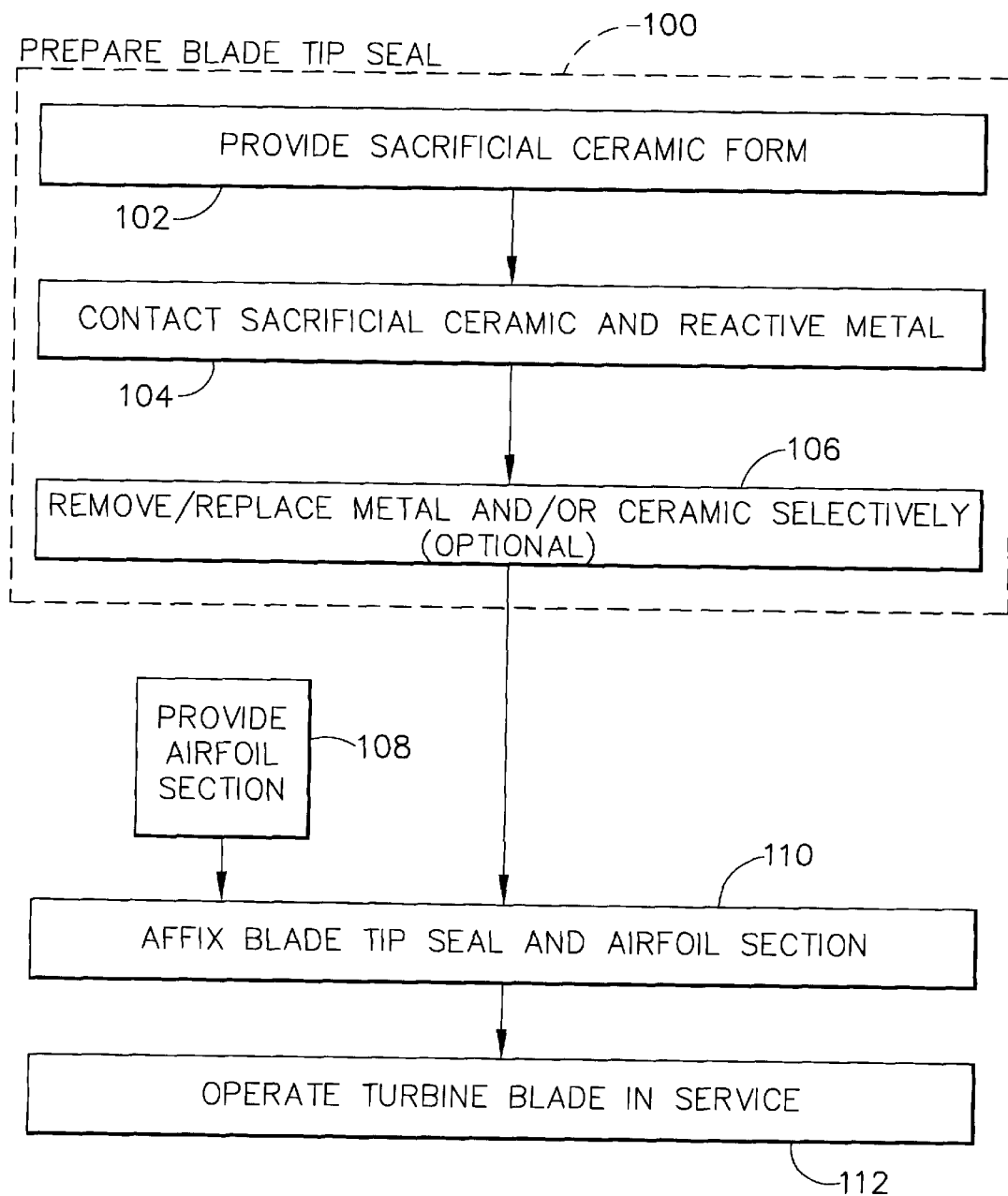
FIG. 6 is a block flow diagram of an approach for preparing the turbine blade.

FIG. 6 illustrates a preferred approach for preparing a turbine blade 20. The blade tip seal 46 is first fabricated as a separate piece from the remainder of the turbine blade 20, numeral 100. The blade tip seal 46 is preferably prepared using the general approach disclosed in U.S. Pat. Nos. 5,214,011 and 5,728,638, whose disclosures are incorporated by reference. A sacrificial ceramic form precursor is prepared in the shape of the final blade tip seal, numeral 102, but slightly oversize to account for subsequent shrinkage during processing. The sacrificial ceramic form is preferably made of silicon dioxide (silica) by slip casting or other operable technique. In this preferred approach, a slip of a sacrificial ceramic material is prepared and cast into a mold that has the same shape, but slightly larger dimensions, than the required dimensions of the blade tip seal. The preferred sacrificial ceramic material is silica (silicon dioxide, $SiO_2$). Additions of modifiers may be made to the ceramic slip. For example, additions that modify the firing behavior of the ceramic, such as calcia (calcium oxide) in the case of silica sacrificial ceramic, may be made. Additions that modify the porosity of the final reacted ceramic material, such as mullite, may be made. Additions that modify the properties of the final reacted ceramic material, such as boron nitride or sol gel alumina to increase the wear resistance of the final reacted ceramic material, may be made. Additions that modify the chemical composition of the final reacted ceramic, such as boron, may be made.

The slip casting of silica particles is well known in other applications, and the same procedures are used here. Typically, a slurry of silica particles and acrylic binder in water is prepared and poured into the mold. The mold and its contents are dried to remove the carrier liquid. The dried slip cast material is thereafter heated to an elevated temperature to consolidate, fire, and fuse the ceramic. In the case of silica, a typical firing temperature is about 2000° F. and a firing time is about 4 hours. The original slip casting was made slightly oversize to account for the shrinkage during drying and firing. The required oversize is known in the art because slip casting is so widely employed for other applications, but is typically about 1–15 percent.

The sacrificial ceramic form is thereafter contacted to a reactive metal, numeral 104, most preferably aluminum. The contacting is preferably accomplished by immersing the sacrificial ceramic form in to the reactive metal. The reactive metal may optionally be mixed with nonreactive metals such as a large fraction of nickel and other elements of the nickel-base alloy of interest for some applications, as disclosed in the '638 patent.

While the sacrificial ceramic form is immersed into the reactive metal, the ceramic of the sacrificial ceramic form is chemically reduced and the reactive metal is chemically oxidized. (Reduction and oxidation are broadly interpreted in the sense of electron transfer.) The reactive metal becomes an oxide or oxidized form, aluminum oxide in the preferred case. As a result of a mechanism involving volume changes and internal fracturing and discussed in the '011 patent, the foam or sponge structure is formed throughout the ceramic as it transforms from the sacrificial form-composition to the final composition. The intracellular volume that results is filled with the metal used in the reaction process.

Portions of the ceramic and/or the metal may optionally be removed or replaced, numeral 106, as might be necessary for particular structures. The metal in the intracellular volume 54 may be chemically removed by etching in an appropriate chemical, as might be required to define the structure of FIG. 3 in the contact region 74. For example, aluminum may be removed by reaction with HCl or NaOH solutions. Some of the ceramic that forms the cell walls 52 may be chemically removed, as might be required, for example, to define the structure of FIG. 3 in the blade interface region 70. For example, aluminum oxide may be removed by alkaline solutions such as KOH or NaOH, where aluminum has been previously replaced by a nickel-base alloy (as discussed next).

Portions of the aluminum metal may be replaced by immersing the aluminum/aluminum oxide composite material into a bath of the replacement liquid metal, such as nickel-base or copper-base alloys. The composite material is maintained in the replacement liquid metal for a period of time, which depends upon the thickness of the composite material. This immersion allows diffusion to take place such that the aluminum is replaced by the liquid replacement metal from the bath. As an example, the aluminum/ aluminum oxide composite material may be immersed in a nickel-base alloy for 8 hours at 1600° C. to effect the substantial complete replacement of the aluminum phase by the nickel-base alloy.

An advantage of the present invention is that the size, shape, and/or dimensions of the blade tip seal, as well as its precursor structures, may be adjusted as necessary at any of several steps in the process. For example, the fired material of step 102, which is silica in the preferred embodiment, may be reshaped or resized by glass shaping techniques or machining. After the contacting step 104 or the step 106, the blade tip seal may be coarse machined and/or fine machined to adjust its size and dimensions, or to add detail features.

The remainder of the turbine blade 20, including the airfoil section 30, is provided, numeral 108. This component is prepared by techniques known in the art, which do not form a part of the present invention. Typically, the turbine blade 20, other than the blade tip seal 46, is prepared by solidification processing of a nickel-base superalloy, for example by non-directed solidification, directional solidification, or single-crystal growth techniques.

The blade tip seal 46, prepared in step 100, and the remainder of the turbine blade 20, are affixed together in the manner illustrated in FIG. 6, numeral 110. The joining may be accomplished by any operable technique. In one approach, the blade interface region 70 of the blade tip seal 46 is electrical resistance welded to the tip end 34 of the airfoil section 30. In another approach, the blade interface region 70 of the blade tip seal 46 is diffusion bonded to the tip end 34 of the airfoil section 30. The two components are pressed together and heated to a sufficiently high temperature that they interdiffuse. In another approach, the blade interface region 70 is brazed to the tip end 34 using an appropriate brazing alloy. In another approach, the blade tip seal 46 is heated above the melting point of the metallic constituent and brought into contact with the airfoil section 30. In yet another approach, a mechanical attachment such as a dovetail on one component and a dovetail slot on the other component are used to hold the two components together. Of these approaches, electrical resistance welding is presently preferred.

The completed turbine blade 20 is operated in service, numeral 112. As discussed earlier, one option to form the porous structure in the contact region 74 is to not remove any metal from the intracellular volume 54 in that region during manufacture, and to simply allow the metal in that region to melt and/or vaporize and thereby be removed during service according to the temperature environment experienced by the turbine blade 20.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A turbine blade, comprising:
an airfoil section having a root end and a tip end;
an attachment at the root end of the airfoil section; and
a blade tip seal joined to the tip end of the airfoil section, the blade tip seal comprising an open-cell solid ceramic foam made of ceramic cell walls having intracellular volume therebetween, wherein the ceramic comprises an aluminum oxide base ceramic material.

2. The turbine blade of claim 1, wherein at least a portion of the intracellular volume is filled with a metal.

3. The turbine blade of claim 1, wherein the ceramic has an abrasive ceramic mixed with the base ceramic material, the abrasive ceramic being more abrasive than the base ceramic material.

4. The turbine blade of claim 1, wherein the blade tip seal comprises an amount exceeding about 60 volume percent of ceramic.

5. The turbine blade of claim 1, wherein the blade tip seal comprises from about 60 to about 80 percent by volume of ceramic.

6. The turbine blade of claim 1, wherein the blade tip seal is in the form of a plate of the ceramic foam.

7. The turbine blade of claim 1, wherein the blade tip seal comprises
a blade interface region adjacent to the tip end of the airfoil section, the blade interface region comprising the ceramic foam and a metal within the intracellular volume, and
a contact region remote from the blade interface region, the contact region comprising the ceramic foam and wherein the intracellular volume is porosity.

8. A turbine blade, comprising:
an airfoil section having a root end and a tip end;
an attachment at the root end of the airfoil section; and
a blade tip seal joined to the tip end of the airfoil section, the blade tip seal comprising an open-cell solid ceramic foam made of ceramic cell walls having intracellular volume therebetween, wherein at least a portion of the intracellular volume is filled with a nickel-base alloy.

9. The turbine blade of claim 8, wherein the ceramic comprises an aluminum oxide base ceramic material.

10. The turbine blade of claim 8, wherein the ceramic has an abrasive ceramic mixed with a base ceramic material, the abrasive ceramic being more abrasive than the base ceramic material.

11. The turbine blade of claim 8, wherein the blade tip seal comprises an amount exceeding about 60 volume percent of ceramic.

12. The turbine blade of claim 8, wherein the blade tip seal comprises from about 60 to about 80 percent by volume of ceramic.

13. The turbine blade of claim 8, wherein the blade tip seal is in the form of a plate of the ceramic foam.

14. The turbine blade of claim 8, wherein the blade tip seal is in the form of a rim of the ceramic foam.

15. The turbine blade of claim 8, wherein the blade tip seal comprises
a blade interface region adjacent to the tip end of the airfoil section, the blade interface region comprising the ceramic foam and the nickel-base alloy within the intracellular volume, and a contact region remote from the blade interface region, the contact region comprising the ceramic foam and wherein the intracellular volume is porosity.

16. A turbine blade, comprising:

an airfoil section having a root end and a tip end;

an attachment at the root end of the airfoil section; and a blade tip seal joined to the tip end of the airfoil section, the blade tip seal comprising an open-cell solid ceramic foam made of ceramic cell walls having intracellular volume therebetween, wherein the blade tip seal is in the form of a rim of the ceramic foam.

17. The turbine blade of claim 16, wherein the ceramic comprises an aluminum oxide base ceramic material.

18. The turbine blade of claim 16, wherein the blade tip seal comprises a blade interface region adjacent to the tip end of the airfoil section, the blade interface region comprising the ceramic foam and a metal within the intracellular volume, and a contact region remote from the blade interface region, the contact region comprising the ceramic foam and wherein the intracellular volume is porosity.

19. A turbine blade, comprising:

an airfoil section having a root end and a tip end;

an attachment at the root end of the airfoil section; and a blade tip seal joined to the tip end of the airfoil section, the blade tip seal comprising an open-cell solid aluminum oxide foam made of aluminum oxide cell walls having intracellular volume therebetween, and wherein the blade tip seal comprises a blade interface region adjacent to the tip end of the airfoil section, the blade interface region comprising the aluminum oxide foam and a nickel-base alloy within the intracellular volume, and a contact region remote from the blade interface region, the contact region comprising the aluminum foam and wherein the intracellular volume is porosity.

20. The turbine blade of claim 19, wherein the blade tip seal comprises an amount exceeding about 60 volume percent of aluminum oxide.

* * * * *